United States Patent
Jones et al.

(10) Patent No.: US 11,164,003 B2
(45) Date of Patent: Nov. 2, 2021

(54) SYSTEM AND METHOD FOR DETECTING OBJECTS IN VIDEO SEQUENCES

(71) Applicant: Mitsubishi Electric Research Laboratories, Inc., Cambridge, MA (US)

(72) Inventors: Michael Jones, Belmont, MA (US); Alexander Broad, Chicago, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 123 days.

(21) Appl. No.: 15/889,308

(22) Filed: Feb. 6, 2018

(65) Prior Publication Data

US 2019/0244028 A1    Aug. 8, 2019

(51) Int. Cl.
    *G06K 9/00*          (2006.01)
    *G06K 9/62*          (2006.01)
      (Continued)

(52) U.S. Cl.
    CPC ...... *G06K 9/00711* (2013.01); *G06K 9/00624* (2013.01); *G06K 9/4628* (2013.01); *G06K 9/6256* (2013.01); *G06K 9/6274* (2013.01); *G06K 9/6277* (2013.01); *G06N 3/0472* (2013.01); *G06T 7/74* (2017.01); *G06T 2207/10016* (2013.01); *G06T 2207/20076* (2013.01); *G06T 2210/12* (2013.01)

(58) Field of Classification Search
CPC .......... G06K 9/00711; G06K 9/00624; G06K 9/4628; G06K 9/6256; G06K 9/6274; G06K 9/6277; G06T 7/74; G06T 2207/10016; G06T 2207/20076; G06T 2210/12; G06N 3/0472

See application file for complete search history.

(56) References Cited

U.S. PATENT DOCUMENTS 8,345,984 B2    1/2013    Ji et al.
9,754,351 B2    9/2017    Paluri et al.
              (Continued)

OTHER PUBLICATIONS

Liu, Zhengyi, et al. "Salient object detection for RGB-D image by single stream recurrent convolution neural network." Neurocomputing 363 (2019): 46-57. (Year: 2019).*

(Continued)

*Primary Examiner* — Pinalben Patel
(74) *Attorney, Agent, or Firm* — Gennadiy Vinokur; Hironori Tsukamoto

(57) ABSTRACT

An object detector includes an input interface to accept a sequence of video frames, a memory to store a neural network trained to detect objects in the video frames, a processor to process each video frame sequentially with the neural network to detect objects in the sequence of video frames, and an output interface to output the object detection information. The neural network includes a first subnetwork, a second subnetwork, and a third subnetwork. The first subnetwork receives as an input a video frame and outputs a feature map of the video frame. The second subnetwork is a recurrent neural network that takes the feature map as an input and outputs a temporal feature map. The third subnetwork takes the temporal feature map as an input and outputs object detection information.

15 Claims, 10 Drawing Sheets

(51) Int. Cl.
*G06T 7/73* (2017.01)
*G06N 3/04* (2006.01)
*G06K 9/46* (2006.01)

(56) References Cited

U.S. PATENT DOCUMENTS

| | | |
|---|---|---|
| 9,760,806 B1 | 9/2017 | Ning et al. |
| 10,289,912 B1* | 5/2019 | Vijayanarasimhan ........................ G06K 9/00718 |
| 2011/0182469 A1* | 7/2011 | Ji ................. G06K 9/00335 382/103 |
| 2016/0358038 A1* | 12/2016 | Jaderberg ............ G06N 3/0454 |
| 2017/0046616 A1* | 2/2017 | Socher ................... G06F 17/50 |
| 2017/0116498 A1* | 4/2017 | Raveane .................. G06N 3/10 |
| 2017/0262995 A1 | 9/2017 | Li et al. |
| 2017/0308756 A1 | 10/2017 | Sigal et al. |
| 2017/0360401 A1* | 12/2017 | Rothberg ................ A61B 8/46 |
| 2018/0211403 A1* | 7/2018 | Hotson .................... G06T 7/60 |
| 2020/0034627 A1* | 1/2020 | Zhu ...................... G06N 3/0454 |
| 2020/0034971 A1* | 1/2020 | Xu ............................ G06T 7/11 |

OTHER PUBLICATIONS

Downs, Justin, "Multi-frame convolutional neural networks for object detection in temporal data." Monterey, California: Naval Postgraduate School. Theses and Dissertations, Calhoun: The NPS Institutional Archive DSpace Repository. http://hdl.handle.net/10945/52976. retrieved Sep. 17, 2018.

Mason Liu et al., "Mobile Video Object Detection with Trmporally Aware Feature Maps," Arxiv.org. Cornell University Library, Ithica NY, 14853. Nov. 17, 2017.

\* cited by examiner

SYSTEM AND METHOD FOR DETECTING OBJECTS IN VIDEO SEQUENCES

TECHNICAL FIELD

This invention relates generally to computer vision, and more particularly to detecting objects in video sequences.

BACKGROUND

Object detection is one of the most fundamental problems in computer vision. This is partially due to its inherent complexity as well as its potential for wide-ranging applications. One of the goals of object detection is to detect and localize the instances of pre-defined object classes in the form of bounding boxes within the input image with confidence values for each detection. An object detection problem can be converted to an object classification problem by a scanning window technique. However, the scanning window technique is inefficient because classification steps are performed for all potential image regions of various locations, scales, and aspect ratios.

The region-based convolution neural network (R-CNN) is used to perform a two-stage approach, in which a set of object proposals is generated as regions of interest (ROI) using a proposal generator and the existence of an object and the classes in the ROI are determined using a deep neural network. However, the detection accuracy of the R-CNN is insufficient for some cases.

A single-shot object detector is another neural network architecture that is used for object detection. In this class of networks, there is no region-proposal stage. Instead the input image is automatically divided into many different overlapping regions and many convolutional and pooling layers directly output a probability for each region. One or more bounding boxes are also output for each region, which are ignored if none of the classes has a high probability. Neural networks of this type tend to be faster than the region proposal type architectures. However, there accuracy is also insufficient for some cases.

This problem is even more apparent in multi-class detection. The phrase "multi-class" refers to the fact that object detectors can detect multiple different object classes using a single detector. The vast majority of this work has focused on using a single image as input. Convolutional neural networks (CNN) have dominated recent progress.

However, for many applications, the natural input to an object detector is a video. Standard practice is to simply process video sequences one frame at a time, treating each frame independently of the others. Although there have been past approaches that attempt to use multiple frames to improve object detection accuracy, these approaches use multiple frames in a pre or post-processing phase. See, e.g., a method described in U.S. Pat. No. 7,391,907, that uses the video sequences to track the object from one frame into another to assist the object detection.

Accordingly, there is a need for multi-class detectors that take multiple frames of video as input.

SUMMARY

It is an object of some embodiments to provide a multi-class object detector that takes multiple frames of video as an input to detect and/or classify the objects in the sequence of video frames. It is another object of some embodiments to provide such a multi-class detector that can concurrently locate and classify one or multiple objects in the multiple frames of the video.

Some embodiments are based on recognition that a multi-class detector can use box-level techniques to operate on the final bounding-box output of object detectors applied to multiple sequential frames. However, the box-level techniques assist in locating the object, not in classifying the object. To that end, some embodiments are based on the recognition that it is desired for a multi-class object detector to use feature-level techniques that consider image features from multiple frames to concurrently locate and classify the object.

However, it is challenging to take advantage of multiple frames together to concurrently locate and classify the object. For example, one approach is to use the multiple frames directly as input to a convolutional neural network. However, some embodiments recognize that this approach does not work well. It is too difficult for the network to learn how to relate raw pixel information across multiple frames.

However, some embodiments are based on the realization that after a few convolutional network layers have processed the input video frame, the resulting feature maps represent higher level image information (such as object parts) which are easier to associate across frames. This insight led to the idea of adding a recurrent neural network layer to a network after a first stage of convolutional neural network layers, because it allows the recurrent units to process higher level information (feature maps) from the current frame as well as previous frames. This architecture led to significant accuracy gains over single-frame object detection networks.

To that end, some embodiments provide a Recurrent Multi-frame Single-Shot Detector (Recurrent Mf-SSD) neural network architecture. This architecture uses multiple sequential frames to improve accuracy without sacrificing the speed of modern object detectors. The Recurrent Mf-SSD network takes a multi-frame video sequence as input and is adapted to handle the change in the input data. The Recurrent Mf-SSD uses a data fusion layer directly after the feature extractor to integrate information from the sequence of input images. The data fusion layer is a recurrent layer. The output of the data fusion layer is then fed into the detection head, which produces the final bounding boxes and classes for the most recent time-stamped image.

For example, the Recurrent Mf-SSD can be implemented as a neural network including a first subnetwork, a second subnetwork, and a third subnetwork. The first subnetwork receives as an input a video frame and outputs a feature map of the video frame. The second subnetwork takes the feature map as an input and outputs a temporal feature map, and the third subnetwork takes the temporal feature map as an input and outputs object detection information.

In various embodiments, the second sub-network is a recurrent neural network having the ability to incorporate temporal information in many domains. Examples of the recurrent neural networks include LSTM and GRU units. The recurrent neural network formed by the second subnetwork combines recursively the inputted feature map with the temporal feature map produced for a previous video frame in the sequence of video frames. In such a manner, the detection head, i.e., the third subnetwork that produces the final bounding boxes and classes for the most recent time-stamped image, can use the higher level information (feature maps) from the current frame as well as previous frames.

In various embodiments, the first and/or the third subnetworks are convolutional networks formed by a combination of convolutional and pooling layers. Additionally, or alternatively, in some embodiments, the Recurrent Mf-SSD uses convolutional recurrent units, instead of fully connected recurrent units, to maintain the fully convolutional structure of object detection architecture. Some embodiments are based on recognition that convolutional recurrent units combine the benefits of standard convolutional layers (i.e. sparsity of connection, suitability to spatial information) with the benefits of standard recurrent layers (i.e. learning temporal features).

Accordingly, one embodiment discloses an object detector including an input interface to accept a sequence of video frames; a memory to store a neural network trained to detect objects in the video frames, the neural network includes a first subnetwork, a second subnetwork, and a third subnetwork, wherein the first subnetwork receives as an input a video frame and outputs a feature map of the video frame, wherein the second subnetwork is a recurrent neural network that takes the feature map as an input and outputs a temporal feature map, and wherein the third subnetwork takes the temporal feature map as an input and outputs object detection information; a processor to process each video frame sequentially with the neural network to detect objects in the sequence of video frames; and an output interface to output the object detection information.

Another embodiment discloses a method for detecting at least one object in a sequence of video frames, wherein the method uses a processor coupled with stored instructions implementing the method, wherein the instructions, when executed by the processor carry out at least some steps of the method including accepting a sequence of video frames; processing each video frame sequentially with a neural network to detect objects in the sequence of video frames, wherein the neural network includes a first subnetwork, a second subnetwork, and a third subnetwork, wherein the first subnetwork receives as an input a video frame and outputs a feature map of the video frame, wherein the second subnetwork is a recurrent neural network that takes the feature map as an input and outputs a temporal feature map, and wherein the third subnetwork takes the temporal feature map as an input and outputs object detection information; and outputting the object detection information.

Another embodiment discloses a non-transitory computer readable storage medium embodied thereon a program executable by a processor for performing a method, the method includes accepting a sequence of video frames; processing each video frame sequentially with a neural network to detect objects in the sequence of video frames, wherein the neural network includes a first subnetwork, a second subnetwork, and a third subnetwork, wherein the first subnetwork receives as an input a video frame and outputs a feature map of the video frame, wherein the second subnetwork is a recurrent neural network that takes the feature map as an input and outputs a temporal feature map, and wherein the third subnetwork takes the temporal feature map as an input and outputs object detection information; and outputting the object detection information.

DETAILED DESCRIPTION

Figure 1:
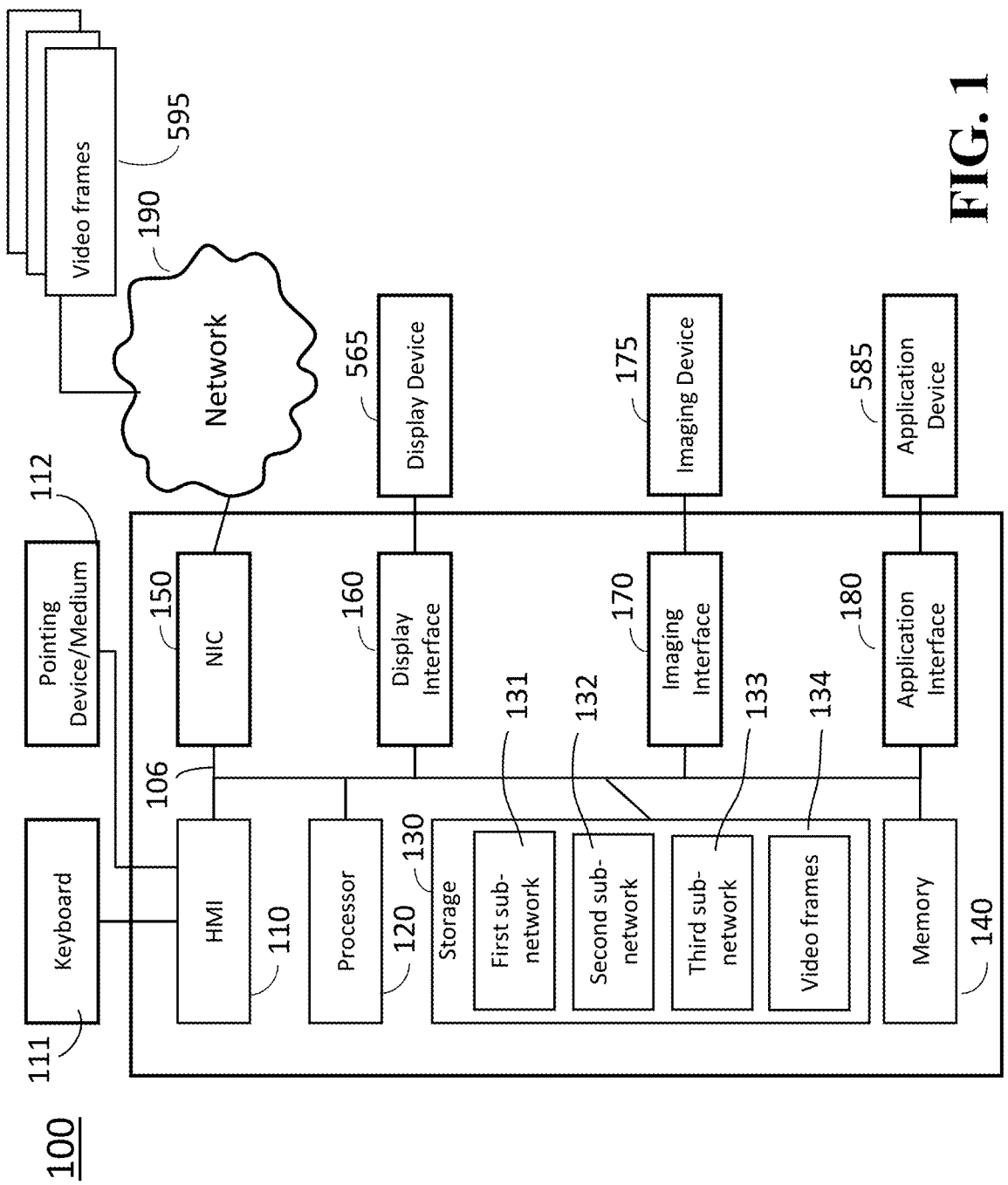
FIG. 1 shows a block diagram of an image processing system 100 for detecting objects in videos in accordance with some embodiments.

FIG. 1 shows a block diagram of an image processing system 100 for detecting objects in videos in accordance with some embodiments. The image processing system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices.

These instructions implement a method for detecting objects in a video sequence. In various embodiments, the object detection produces a set of bounding boxes indicating the locations and sizes of objects in each video frame along with a vector of probabilities for each bounding box indicating the likelihood that each output bounding box contains each particular object class.

The image processing system 100 is configured to detect objects in a video using a neural network including three subnetworks. Such a neural network is referred herein as Multi-frame Single Shot neural network. To that end, the image processing system 100 can also include a storage device 130 adapted to store the video frames 134 and the three subnetworks 131, 132, 133 that make up the Multi-frame Single Shot Detector network. The storage device 130 can be implemented using a hard drive, an optical drive, a thumb drive, an array of drives, or any combinations thereof.

In some implementations, a human machine interface 110 within the image processing system 100 connects the system to a keyboard 111 and pointing device 112, wherein the pointing device 112 can include a mouse, trackball, touchpad, joy stick, pointing stick, stylus, or touchscreen, among others. The image processing system 100 can be linked through the bus 106 to a display interface 160 adapted to connect the image processing system 100 to a display device 565, wherein the display device 565 can include a computer monitor, camera, television, projector, or mobile device, among others.

The image processing system 100 can also be connected to an imaging interface 170 adapted to connect the system to an imaging device 175. In one embodiment, the frames of video on which the object detector is run are received from the imaging device. The imaging device 175 can include a video camera, computer, mobile device, webcam, or any combination thereof.

A network interface controller 150 is adapted to connect the image processing system 100 through the bus 106 to a network 190. Through the network 190, the video frames 134 or subnetworks 131, 132, 133 can be downloaded and stored within the computer's storage system 130 for storage and/or further processing.

In some embodiments, the image processing system 100 is connected to an application interface 180 through the bus 106 adapted to connect the image processing system 100 to an application device 585 that can operate based on results of object detection. For example, the device 585 is a car navigation system that uses the locations of detected objects to decide how to steer the car.

Figure 2:
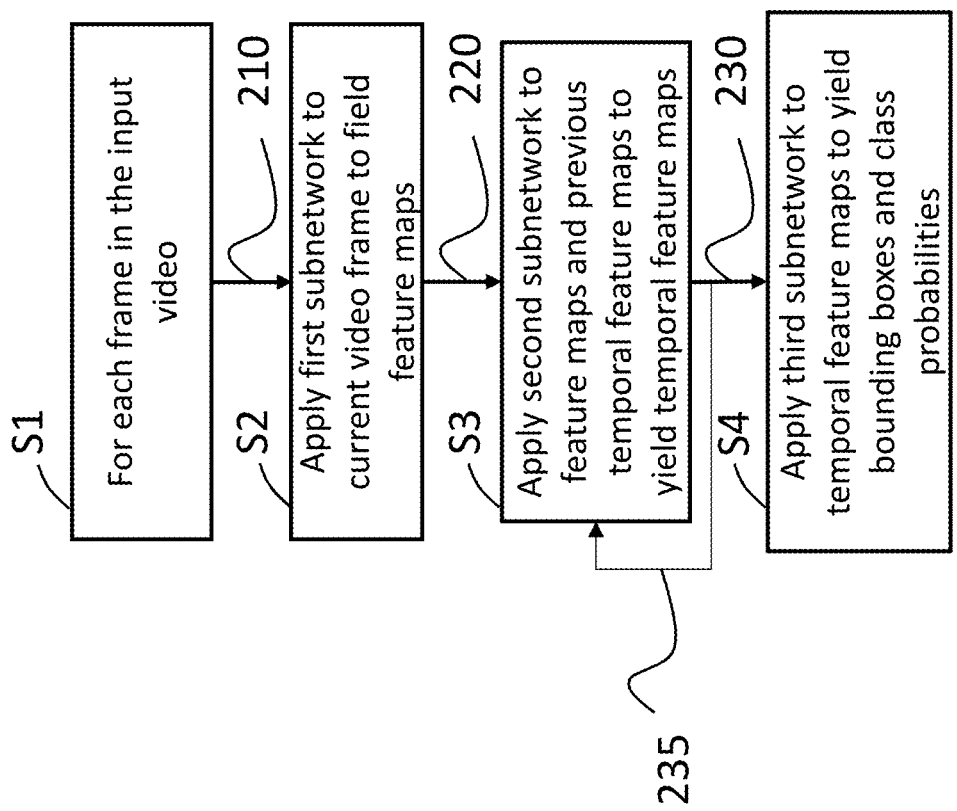
FIG. 2 shows a flowchart of a method for detecting objects in frames of a video according to some embodiments.

FIG. 2 shows a flowchart of a method for detecting objects in frames of a video according to some embodiments. In step S1, each frame 210 of an input video sequence is fed sequentially to the video object detection network, including three subnetworks. In such a manner, some steps of the method of FIG. 2, such as steps S2, S3, and S4, are performed iteratively for each frame. In step S2, the first subnetwork 131 is applied to the current video frame and computes a set of feature maps 220 representing features of the video frame. In some implementations, a feature map is a 2D array of floating point numbers. This feature map is similar to a monochrome image, except an image typically includes one byte values represented by the whole numbers [0, . . . , 255]. These feature maps are used as input to the second subnetwork in step S3.

The second subnetwork 132 is a recurrent network and uses the feature maps 220 computed in step S2 as well as temporal feature maps 235 computed in the previous iteration of step S3 to compute a new set of temporal feature maps 230. The feature maps 230 are referred as the temporal feature maps because they represent features computed over many frames. Step S4 takes the temporal feature maps 230 and applies a third subnetwork 133 which outputs a set of bounding boxes and class probabilities which encode spatial locations and likely object classes for each detected object in the current video frame.

Figure 3A:
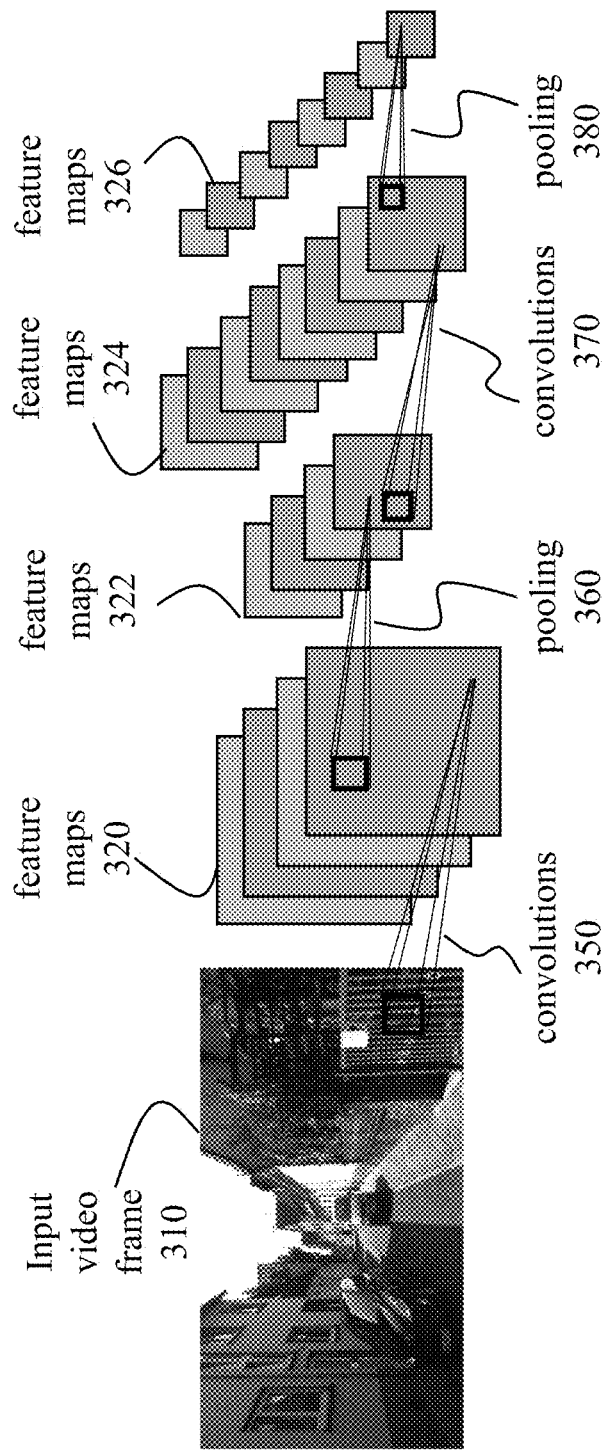
FIG. 3A shows a diagram of a representative convolutional neural network (CNN) architecture for the first subnetwork according to some embodiments.

FIG. 3A shows a diagram of a representative convolutional neural network (CNN) architecture for the first subnetwork according to some embodiments. The first subnetwork 131 takes a frame of the video 310 as input and uses a number of convolutions 350 to generate a set of feature maps 320. Then a pooling operation 360 is used to consolidate neighborhoods of the feature maps and create smaller feature maps 322. The convolution and pooling layers 322, 324, 326 can be repeated any number of times. Convolutional layers may also occur without a corresponding pooling layer. Typically, a convolutional layer also includes a nonlinear activation function such as a sigmoid function or rectified linear function. A final set of feature maps 326 is output by the CNN as the feature maps 210.

Figure 3B:
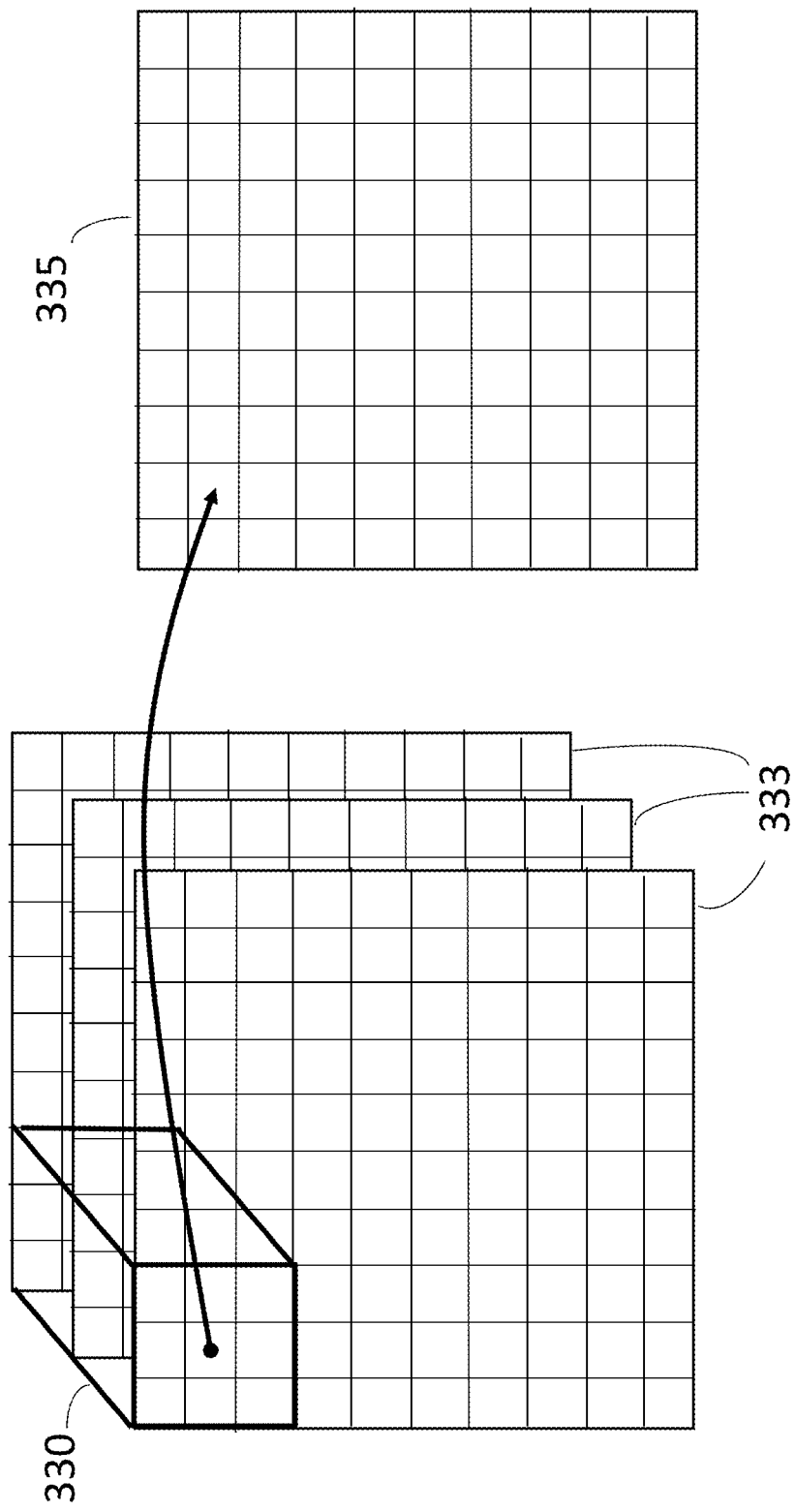
FIG. 3B shows a schematic of a convolution operation used by one embodiment.

FIG. 3B shows a schematic of a convolution operation used by one embodiment. A convolution is a mathematical operation that takes as input a convolution kernel 330 and a set of images or feature maps 333 and multiplies the pixels in each region of the set of images or feature maps 333 by the elements of the convolution kernel 330. A convolution kernel 330 as used for convolutional neural networks is a k×k×M tensor of floating point numbers where k is the size of the kernel (typically a small whole number such as 3, 5 or 7) and M is the number of channels in the image (3 for a color image) or the number of feature maps. The multiplication of the set of images/feature maps 333 by the convolution kernel 330 is the sum of the product of each element of the convolution kernel with the corresponding pixel in a region of the images/feature maps. The convolution kernel 330 is scanned over each region of the set of images/feature maps 333 with a fixed step size (typically 1) to generate a floating point number for each region. The result is a 2D feature map 335 of floating point numbers. The values of the convolution kernel are typically learned in a neural network training stage.

Figure 3C:
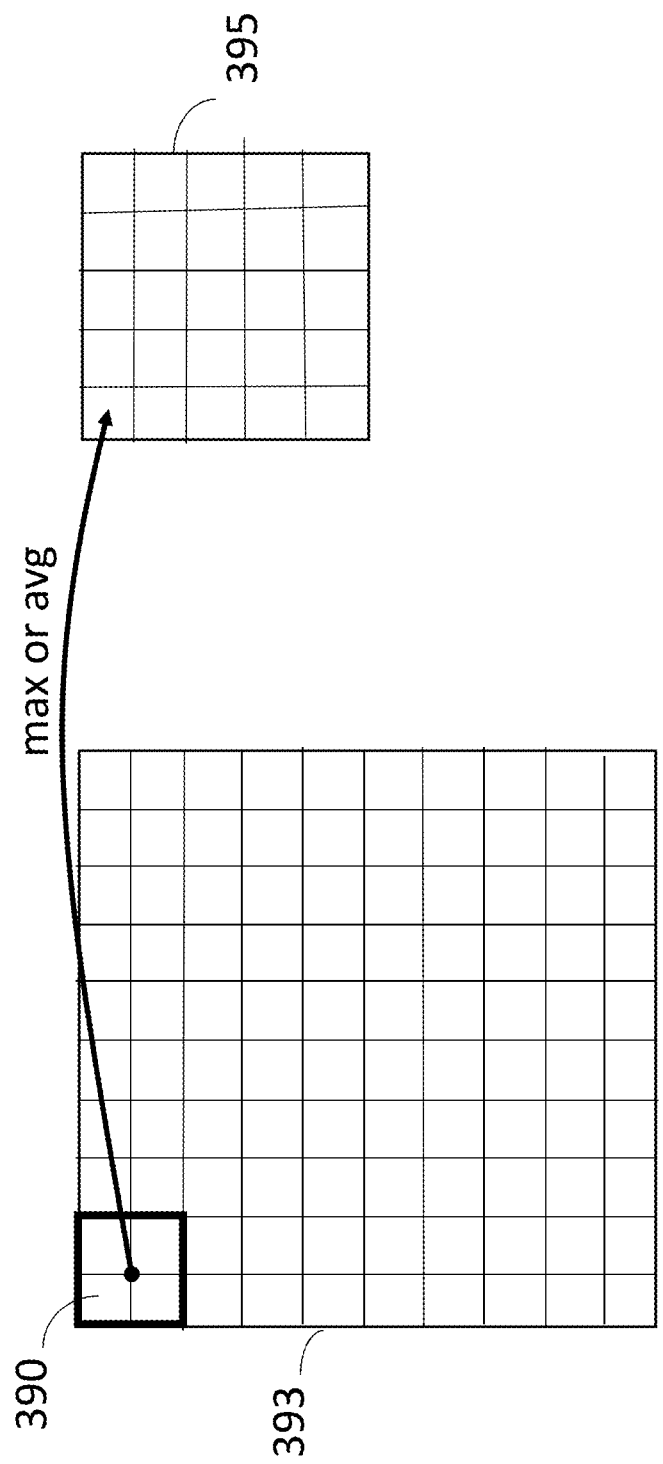
FIG. 3C shows a schematic of a pooling operation used by one embodiment.

FIG. 3C shows a schematic of a pooling operation used by one embodiment. A pooling operation takes a feature map 393 as input and outputs a new feature map 395 with the height and width reduced by a factor of n relative to the input feature map, where n is a whole number (typically 2). The pooling operation scans over the input feature map 393 and for each n×n region 390 of the feature map applies a pooling operation to all the pixels in that region. Typical pooling operations are max (output the maximum value over all pixels in the region) or average (output the average value over all pixels in the region). For example, a 2×2 pooling operation outputs a single floating point number for each 2×2 region of the input feature map, thus creating an output feature map that is half the size (in both height and width) compared to the input feature map. Such pooling operations are useful for aggregating nearby features in a feature map and making the convolutional neural network less sensitive to small translations in the input image.

Figure 4A:
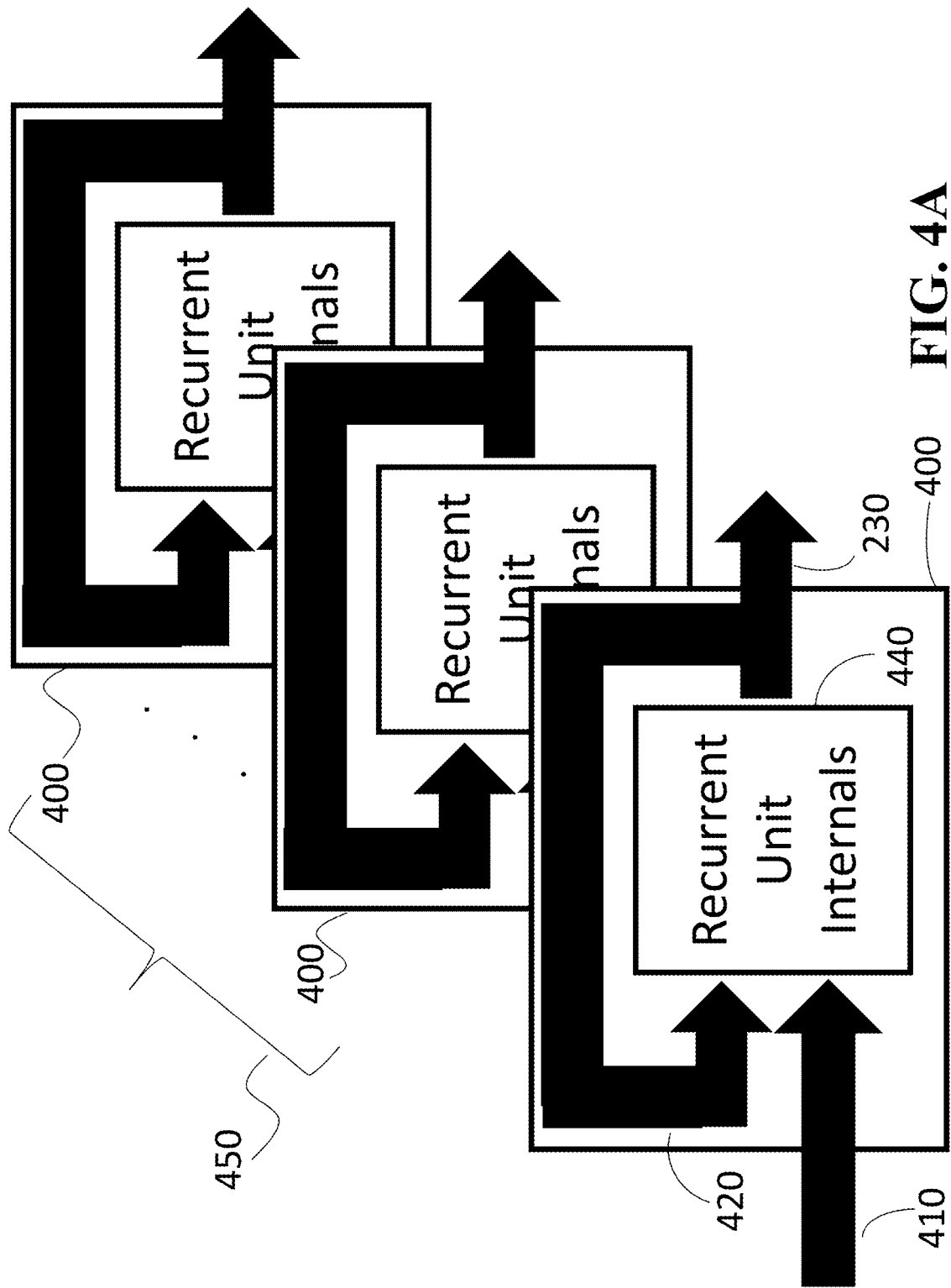
FIG. 4A shows a diagram of the second subnetwork which is a recurrent network according to some embodiments.

FIG. 4A shows a diagram of the second subnetwork which is a recurrent network according to some embodiments. A recurrent network is one that receives previous outputs of the recurrent network as input in addition to other inputs. A recurrent network includes one or more recurrent units 400. Each recurrent unit has two input tensors 410 and 420. The external input tensor 410 is a feature vector, feature map or set of feature maps from some external input source, such as the output of the first subnetwork. The recurrent input tensor 420 is a temporal feature map that is output from one or multiple recurrent units 400 on the previous time steps 450. The output of the recurrent unit 400 is a temporal feature map 230. The recurrent unit internals 440 is a function of the inputs 410 and 420 and a possible hidden state that computes the temporal feature map 230 output. Examples of recurrent units include long short-term memory units, gated recurrent units and convolutional gated recurrent units.

Figure 4B:
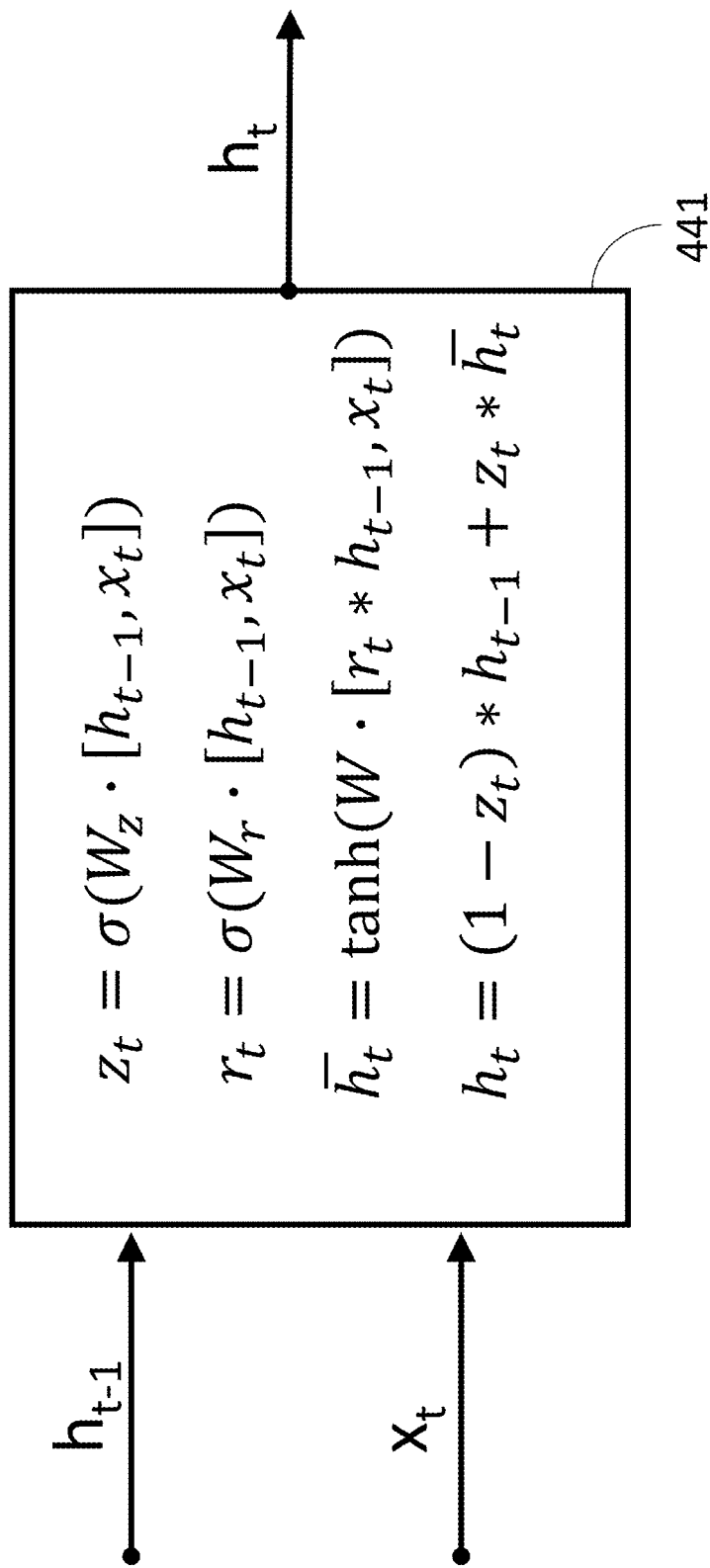
FIG. 4B schematic of the details of one type of recurrent unit internals, called a gated recurrent unit, used by one embodiment.

FIG. 4B schematic of the details of one type of recurrent unit internals 440, called a gated recurrent unit 441, used by one embodiment. The output, $h_t$, is a function of the output of this recurrent unit at the previous time step t−1 and the current input $x_t$. The basic intuition of these equations is that the current input and the output from the previous time step are used to compute gating factors that determine how much the previous output contributes to the new output (which is also a function of the current input). In the gated recurrent unit 441, a notation "•" denotes matrix-vector multiplication, [x, y] denotes concatenation of vectors, σ( ) denotes the element-wise sigmoid function, and * denotes the Hadamard product. There are various other possibilities for the recurrent unit internals used by different embodiments, e.g., long short-term memory units.

Figure 5:
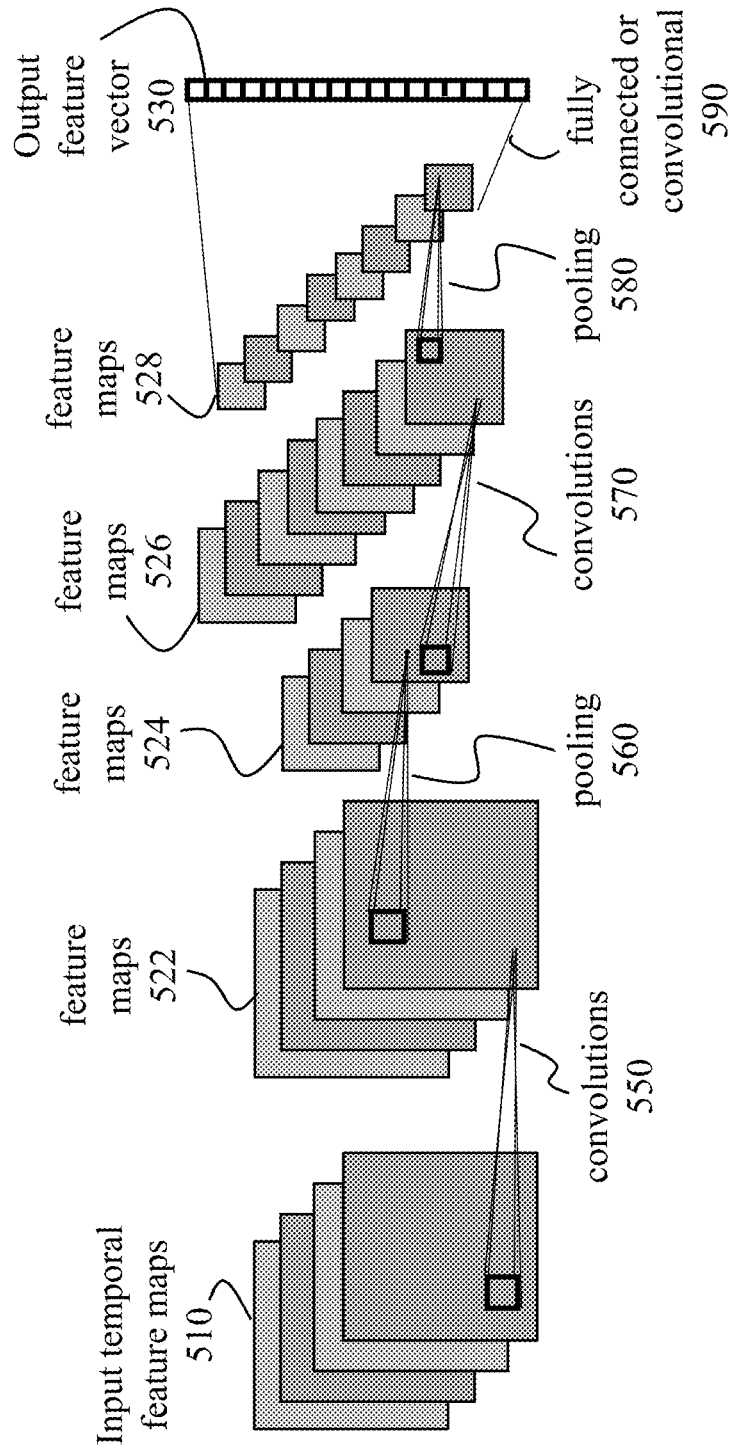
FIG. 5 shows a diagram of a representative CNN used for the third subnetwork according to some embodiments.

FIG. 5 shows a diagram of a representative CNN used for the third subnetwork according to some embodiments. This third subnetwork takes as input a set of temporal feature maps 230 output by the second subnetwork. This is followed by a series of convolutions 550, 570 (possibly with nonlinear activation functions) and pooling layers 560, 580. This is followed by a final fully connected or convolutional layer that outputs a feature vector 590 representing a set of bounding boxes and object class probabilities which indicate the locations and types of detected objects in the frame.

Figure 6:
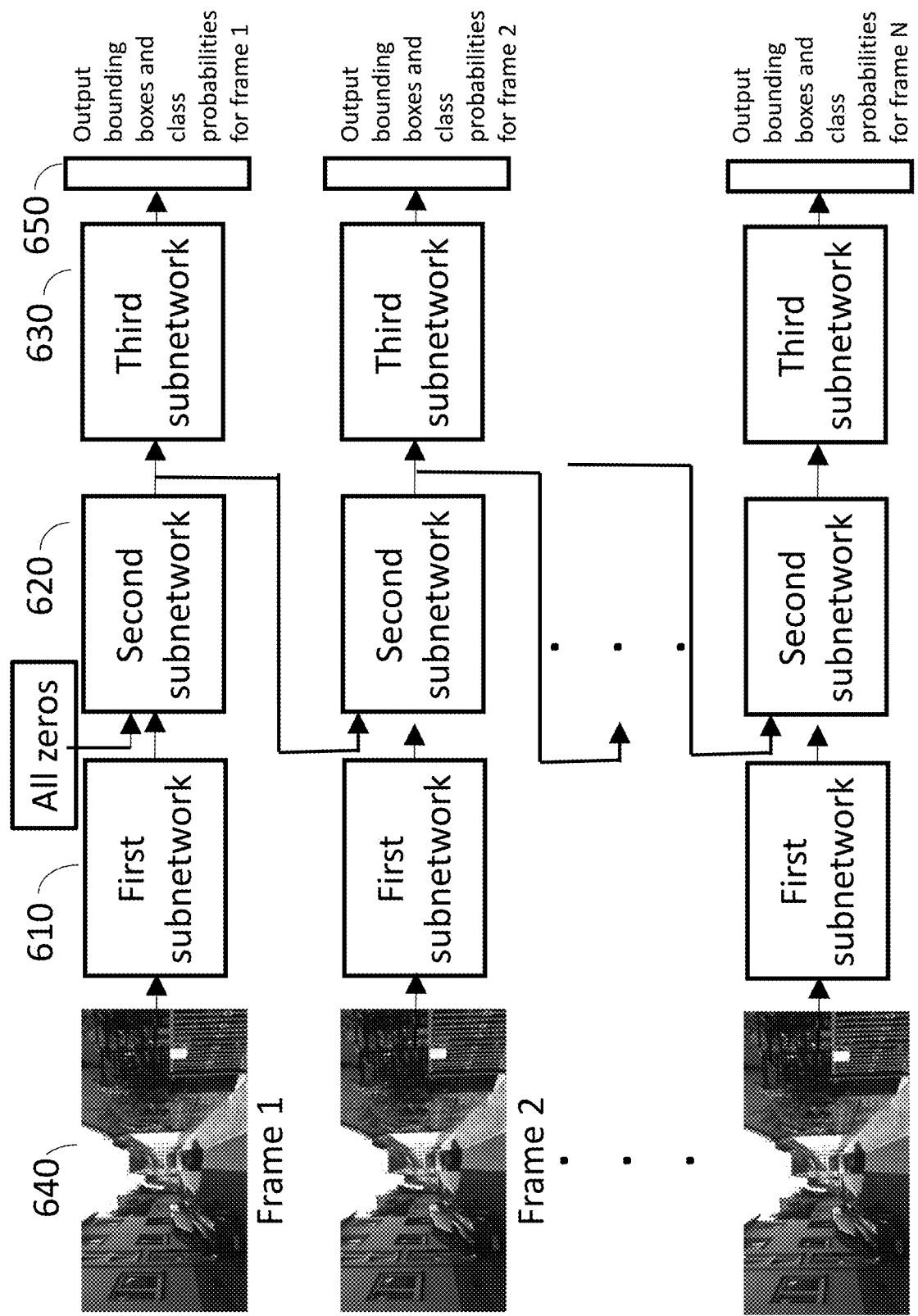
FIG. 6 shows a block diagram of the system including first, second and third subnetworks processing a sequence of video frames according to some embodiments.

FIG. 6 shows a block diagram of the system including first 610, second 620 and third 630 subnetworks processing a sequence of video frames 640 according to some embodiments. The first subnetwork 610 uses a convolutional neural network to compute a set of feature maps from a single frame of the video. These feature maps are passed to the second subnetwork 620 along with the temporal feature maps computed on the previous time step. In some implementations, for the first frame of a video, the previous temporal feature maps are set to all zeros. The second subnetwork 620 uses a set of recurrent units to compute a new set of temporal feature maps which are passed to the third subnetwork 630. The third subnetwork 630 uses a convolution neural network to compute a set of bounding boxes and class probabilities 650 that indicate the locations and classes of all objects detected in the current frame.

The neural network with three subnetworks can include many parameters. These parameters are optimized during a training phase from many example videos for which the ground truth object bounding boxes and classes are known. The training phase uses an algorithm to optimize the weights of the network such as stochastic gradient descent.

Figure 7:
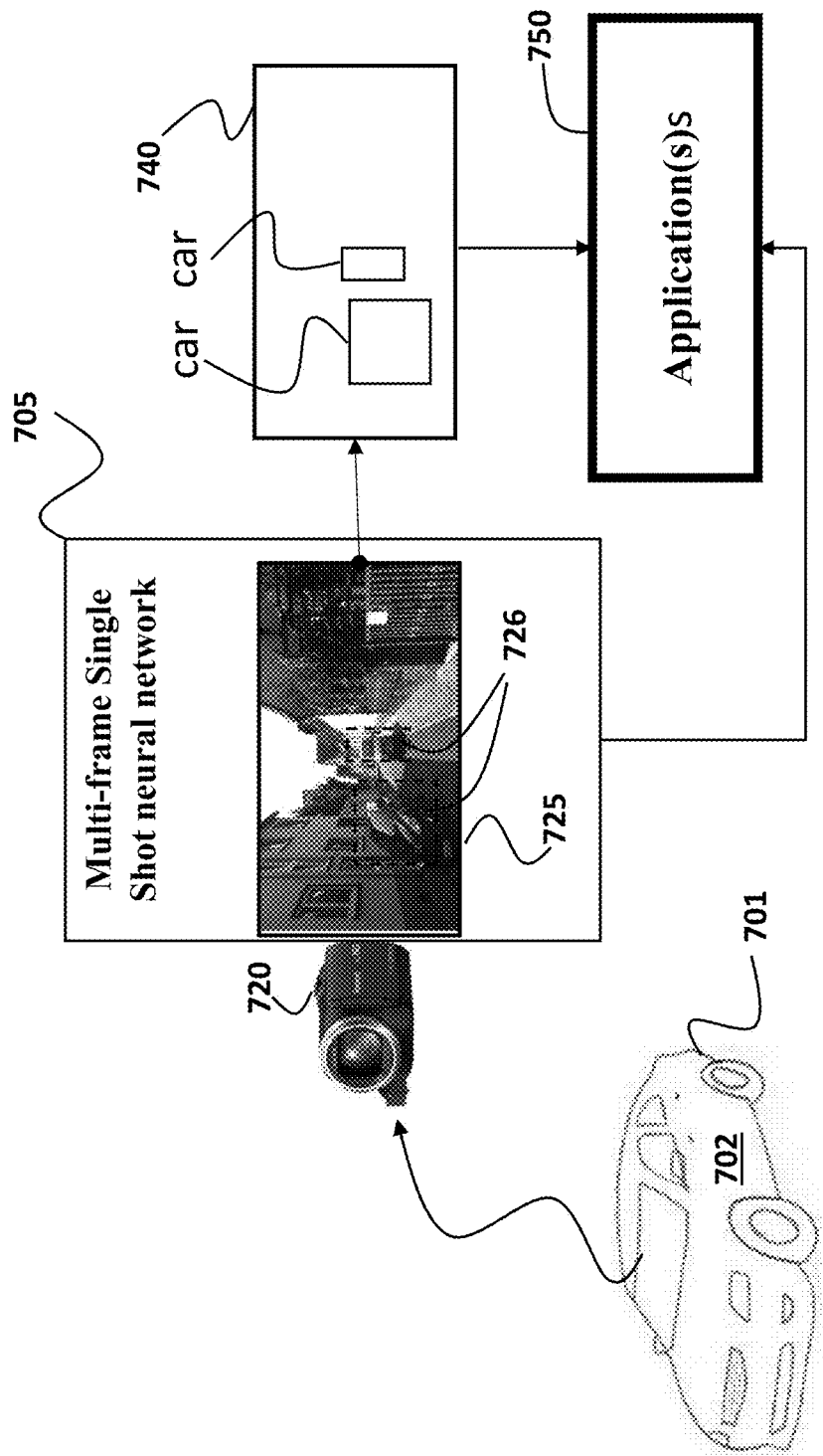
FIG. 7 shows a schematic of a vehicle including a processor for running a multi-frame single short neural network according to one embodiment.

FIG. 7 shows a schematic of a vehicle 701 including a processor 702 for running a multi-frame single shot neural network 705 according to one embodiment. This embodiment takes advantage of a video sequence the vehicle 701 is using to evaluate its surroundings. The vehicle 701 includes at least one sensor 720 for acquiring a video sequence.

The vehicle also includes a processor 702 to run an object detector. For example, the neural network 705 can detect the objects 726 in the sequence of images 725 and output a set of object bounding boxes and object classes 740. The processor 702 can be configured to perform other applications 750 that take advantage of the object detector 705. Examples of the applications 750 include control application for moving the vehicle 701 and/or various computer vision applications.

In other words, one embodiment uses joint calibration and fusion 730 to augment both sensors, i.e., to increase resolution of the LIDAR output 735 and to incorporate high-resolution depth information into the camera output. The result of the fusion can be rendered on a display 740 or submitted to different applications 750, e.g., an object tracking application.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

We claim:

1. An object detector, comprising:
an input interface configured to accept a sequence of video frames;
a memory configured to store a neural network trained to detect objects in the video frames, the neural network includes a first subnetwork, a second subnetwork, and a third subnetwork, wherein the first subnetwork receives as an input a current video frame and outputs a current feature map of the current video frame, wherein the second subnetwork is a recursive neural network that combines the current feature map of the current video frame with a previous temporal feature map produced by the second subnetwork for a previous video frame in the sequence of video frames to output a current temporal feature map of the current video frame, and wherein the third subnetwork takes the current temporal feature map of the current video frame as an input and outputs object detection information;
a processor configured to process each video frame sequentially with the neural network to detect objects in the sequence of video frames; and
an output interface configured to output the object detection information.

2. The object detector of claim 1, wherein the first subnetwork and the third subnetwork are convolutional neural networks.

3. The object detector of claim 1, wherein the second subnetwork includes gated recurrent units.

4. The object detector of claim 1, wherein the second subnetwork includes long short-term memory units.

5. The object detector of claim 1, wherein the second subnetwork includes convolutional recurrent units.

6. The object detector of claim 1, wherein the recurrent neural network formed by the second subnetwork combines recursively the current feature map with the previous temporal feature map produced for the previous video frame in the sequence of video frames.

7. The object detector of claim 1, wherein one or a combination of the first subnetwork and the third subnetwork is a convolutional network formed by a combination of convolutional and pooling layers.

8. The object detector of claim 7, wherein the first subnetwork outputs a set of feature maps such that there is one feature map for each convolution of the last convolutional layer of the first subnetwork.

9. The object detector of claim 8, wherein the second subnetwork determines a set of temporal feature maps for the set feature maps, and wherein the third subnetwork determines from the set of temporal feature maps a set of one or more bounding boxes defining positions of objects in the video frame and class probabilities of each object.

10. The object detector of claim 1, wherein the neural network is trained to detect multiple objects of different classes in the sequence of video frames, such that the object detector of claim 1 is a multi-class detector.

11. The object detector of claim 1, wherein the output interface renders a location of the detected object and a class of the detected object on a display device or transmits the detected object and the class of the detected object over a network.

12. The object detector of claim 1, wherein the processor determines a location of the detected object and a set of probabilities defining a likelihood of the detected object to belong to each class from a set of classes.

13. A method for detecting at least one object in a sequence of video frames, wherein the method uses a processor coupled with stored instructions implementing the method, wherein the instructions, when executed by the processor carry out at least some steps of the method comprising:

accepting a sequence of video frames;

processing each video frame sequentially with a neural network to detect objects in the sequence of video frames, wherein the neural network includes a first subnetwork, a second subnetwork, and a third subnetwork, wherein the first subnetwork receives as an input a current video frame and outputs a current feature map of the current video frame, wherein the second subnetwork is a recursive neural network that combines the current feature map of the current video frame with a previous temporal feature map produced for a previous video frame in the sequence of video frames to output a current temporal feature map of the current video frame, and wherein the third subnetwork takes the current temporal feature map of the current video frame as an input and outputs object detection information; and outputting the object detection information.

14. The method of claim 13, wherein the object detection information includes different locations and different classes of multiples objects in the sequence of video frames.

15. A non-transitory computer readable storage medium embodied thereon a program executable by a processor for performing a method, the method comprising:

accepting a sequence of video frames;

processing each video frame sequentially with a neural network to detect objects in the sequence of video frames, wherein the neural network includes a first subnetwork, a second subnetwork, and a third subnetwork, wherein the first subnetwork receives as an input a current video frame and outputs a current feature map of the current video frame, wherein the second subnetwork is a recursive neural network that combines the current feature map of the current video frame with a previous temporal feature map produced for a previous video frame in the sequence of video frames to output a current temporal feature map of the current video frame, and wherein the third subnetwork takes the current temporal feature map of the current video frame as an input and outputs object detection information; and outputting the object detection information.

* * * * *